(12) United States Patent  
Magiawala et al.

(10) Patent No.: US 6,278,361 B1  
(45) Date of Patent: Aug. 21, 2001

(54) SYSTEM AND METHOD FOR MONITORING VEHICLE CONDITIONS AFFECTING TIRES

(75) Inventors: Kiran R. Magiawala, Hawthorne; Carol A. Eberhard, Rolling Hills Estates; George W. McIver, Redondo Beach; Barry Dunbridge, Torrance; Thomas A. Zimmerman, Rancho Palos Verdes, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/454,443

(22) Filed: Dec. 3, 1999

(51) Int. Cl.[7] ........................................ B60Q 1/00
(52) U.S. Cl. .................. 340/438; 73/11.04; 340/440; 701/29; 702/183
(58) Field of Search ..................... 340/438, 440, 340/441, 539, 669; 73/11.04; 701/29; 702/183

(56) References Cited

U.S. PATENT DOCUMENTS 5,525,960 * 6/1996 McCall et al. ...................... 340/438
5,557,552 * 9/1996 Naito et al. ...................... 340/438 X
5,809,437 * 9/1998 Breed ...................................... 701/29

* cited by examiner

Primary Examiner—Thomas Mullen
(74) Attorney, Agent, or Firm—Robert W. Keller (57) ABSTRACT

A system and method for monitoring tread wear, shock absorber performance, balance condition of a vehicle tire, and/or rotation speed of a vehicle wheel, use a sensor to provide acceleration signals. To monitor tread wear, acceleration signals from the sensor determine at least one resonance frequency of at least one of the radial and lateral acceleration of the tire and compares it to at least one stored resonance frequency To monitor shock absorber performance, the amplitude of the Fourier component of the radial acceleration is compared to a stored amplitude value. To monitor a balance condition of a vehicle tire, the sensor provides acceleration signals measured over a specified time duration to determine an amplitude of the Fourier component of the radial acceleration that is compared to a stored amplitude specification balance condition of the tire.

38 Claims, 4 Drawing Sheets

SYSTEM AND METHOD FOR MONITORING VEHICLE CONDITIONS AFFECTING TIRES

BACKGROUND OF THE INVENTION

The present invention relates to a system and method for monitoring tread wear, shock absorber performance, balance condition of a vehicle tire, and/or rotational speed of a vehicle wheel.

The handling performance of a motor vehicle, e.g., vehicle steering and braking, as well as fuel consumption, is affected by the condition of the tires. Handling performance can be affected by improper tire inflation, abnormal tire wear, out of balance conditions, as well as by poorly performing shock absorbers.

It is estimated that a significant percentage of tires wear out due to abnormal tire tread wear. As a result, over the course of vehicle life, the vehicle would need an additional set of tires, costing additional money. Thus, to save this cost it is desired to alert the driver of abnormal tire wear and other conditions affecting the tires, including improper balance, poorly functioning shock absorbers and improper inflation pressure.

A tire monitoring system currently available from Smartire Systems, Inc. uses wireless technology to monitor the air pressure and temperature in vehicle tires using wireless wheel-mounted sensors and a display receiver mounted within sight and reach of the driver. One sensor is mounted on each wheel and the tire mounted over the sensor, each sensor containing a pressure transducer, a temperature transducer, a centrifugal switch, a radio transmitter and a lithium battery. The display module shows required pressure, actual pressure, pressure status and temperature. While this system provides temperature and pressure information, it does not provide information about tread wear, balance and shock absorber performance.

In addition, anti-lock braking systems (ABS) and integrated vehicle controllers (IVC) require the input of information indicating the wheel rotational speed for each wheel. Currently, a separate wheel speed sensor is provided for each wheel and typically consists of a toothed wheel made of a magnetic disk attached coaxially to a corresponding axle rotatably supporting a tire and a pick-up coil arranged adjacent each toothed wheel with an interval therebetween to provide an alternating sensor signal having a frequency indicative of speed of each tire. It would be desirable to eliminate the need for this type of sensor by using a sensor which also provides additional functions.

SUMMARY OF THE INVENTION

The present invention relates to a system and method for monitoring at least one of tire tread wear, shock absorber performance, balance condition of a vehicle tire, and wheel rotational speed.

According to the present invention, a system and method for monitoring at least tire tread wear of a vehicle tire are provided. The system and method use a sensor which senses at least one of radial and lateral acceleration of a tire to provide acceleration signals. The signals are provided to at least one processor which processes the signals. A single processor or multiple processors can be used. The sensor and the at least one processor can be mounted on the wheel, e.g., on the rim either inside the tire or outside the tire in a protective casing. The at least one processor is responsive to acceleration signals from the sensor and determines at least one resonance frequency of at least one of the radial and lateral acceleration of the tire, compares the determined at least one resonance frequency to at least one stored frequency, determines the tire tread wear on the basis of the comparison, and provides an information signal indicative of tire tread wear which is transmitted to a driver information display. The signal can be either an alarm signal or a quantitative indication of tread wear.

More particularly, the at least one processor calculates a Discrete Fourier Transform (DFT) of the acceleration signals, e.g., by taking a Fast Fourier Transform (FFT) of the acceleration signals, to determine the at least one resonance frequency of at least one of the radial and lateral acceleration of the tire measured over a time duration longer than a vehicle suspension time constant. For example, the at least one processor may take a Fast Fourier Transform (FFT) of the radial and/or lateral acceleration signals to determine a resonance frequency in the range of 30–60 Hz of the radial and/or lateral acceleration of the tire, compare the resonance frequency to a stored resonance frequency in the range of 30–60 Hz indicative of no tire wear to determine a frequency shift, and determine tire tread wear on the basis of the frequency shift.

Preferably, a transmitter provided on a rim on which the tire is mounted or inside the tire wirelessly transmits the information signal to a receiver provided onboard the vehicle for receiving the wirelessly transmitted information signal.

According to another aspect of the invention, a system and method for monitoring at least shock absorber performance of a shock absorber attached to a vehicle wheel are provided. The system and method use a sensor which senses at least the radial acceleration of a tire to provide acceleration signals. The signals are provided to at least one processor which processes the signals. A single processor or multiple processors can be used. The sensor and the at least one processor can be mounted on the wheel, e.g., on the rim either inside the tire or outside the tire in a protective casing. The at least one processor is responsive to acceleration signals from the sensor and calculates a Discrete Fourier Transform (DFT) of the acceleration signals, e.g., by taking a Fast Fourier Transform (FFT) of the acceleration signals, measured over a time duration longer than a vehicle suspension time constant, determines an amplitude of the Fourier component of the radial acceleration, e.g., in the range of 0.5–2.0 Hz, compares the amplitude profiles to a stored amplitude profile, e.g., in the range of 0.5–2.0 Hz indicative of a new shock absorber for the vehicle, and determines shock absorber performance on the basis of any change in the amplitude profile over the stored amplitude, and provides an information signal indicative of shock absorber performance which is transmitted to the driver information display.

According to another aspect of the invention, a system and method for monitoring at least a balance condition of a vehicle tire are provided. The system and method use a sensor which senses at least the radial acceleration of a tire to provide acceleration signals. The signals are provided to at least one processor which processes the signals. A single processor or multiple processors can be used. The sensor and the at least one processor can be mounted on the wheel, e.g., on the rim either inside the tire or outside the tire in a protective casing. The at least one processor is responsive to acceleration signals from the sensor and calculates a Discrete Fourier Transform (DFT) of the acceleration signals, e.g., by taking a Fast Fourier Transform (FFT) of the acceleration signals, measured over a time duration longer than a vehicle suspension time constant, determines an amplitude of the Fourier component of the radial acceleration, e.g., in the range of 5–14 Hz, compares the amplitude to a stored amplitude, e.g., in the range of 5–14 Hz indicative of a specification predetermined balanced tire for the vehicle, and determines any out of specification predetermined balance condition of the tire on the basis of any increase in the amplitude over the stored amplitude.

According to another aspect of the invention, a system and method for monitoring at least wheel rotational speed of a vehicle wheel are provided. The system and method use a sensor which senses at least the radial acceleration of a tire to provide acceleration signals. A transceiver then transmits a radial signal frequency, e.g., in the range of 0–25 Hz indicative of wheel rotational speed to a vehicle controller such as an antilock braking system or an integrated vehicle controller. This system can be used to replace the wheel speed sensors currently being used.

DETAILED DESCRIPTION OF THE INVENTION

The present invention provides a system and method for monitoring at least one of tire tread wear, shock absorber performance, balance condition of a tire and rotational speed of a vehicle wheel based on measurements of at least one of radial and lateral acceleration of the wheel or tire. According to the present invention, the tread wear, shock absorber performance, balance condition and rotational speed of the vehicle wheel can be measured singly or in any combination. In addition to monitoring any or all of tread wear, shock absorber performance, balance condition and wheel rotational speed, the present invention can be used to monitor temperature and pressure within the tire.

Figure 1:
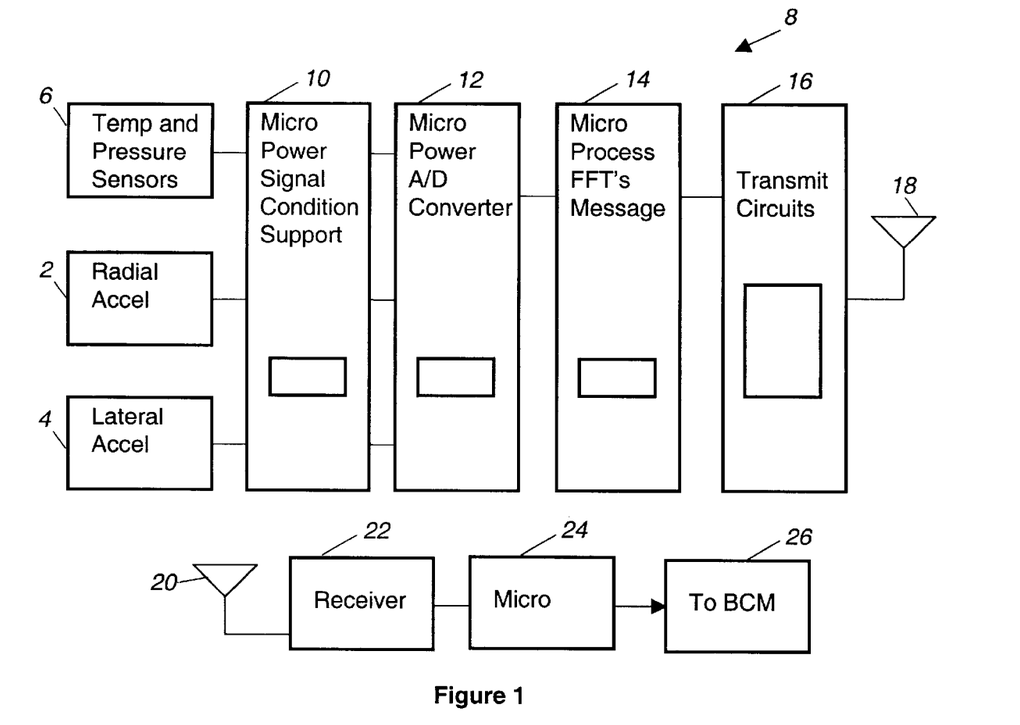
FIG. 1 is a block diagram explaining an embodiment of the present invention.

FIG. 1 is a block diagram explaining an embodiment of the present invention. As shown in FIG. 1, one or more sensors are provided for sensing conditions at the vehicle wheel, either inside the tire or outside the tire on the wheel rim. At least a radial accelerometer 2 is provided for measuring the radial acceleration of the tire or wheel. By radial acceleration is meant the acceleration of the wheel or tire in a radial direction, i.e., in a direction perpendicular to the axis of rotation of the tire. A lateral accelerometer 4 may also be provided for measuring the lateral acceleration of the wheel or tire. By lateral acceleration is meant the acceleration of the wheel or tire in a lateral direction, i.e., along the axis of rotation of the tire, i.e., a door-to-door acceleration. Temperature and pressure sensors 6 can also be provided. For example, a temperature transducer and a pressure transducer can be provided and operated in the same manner as in the tire monitoring system of Smartire Systems, Inc. A centrifugal switch, not shown, may also be included so that the system is switched on only when the vehicle is in motion and is switched off or switched into a sleep mode when the vehicle stops, thereby extending battery life.

The radial accelerometer 2 and lateral accelerometer 4 may be provided as a two axis accelerometer. Alternatively, a three axis accelerometer may also be provided such that the tangential acceleration is also measured. Tangential acceleration is the acceleration in the tangential direction of the circumference of the wheel.

The radial accelerometer 2 and lateral accelerometer 4 (e.g., in the form of a two-axis accelerometer) and any other sensor provided, e.g., the temperature and pressure sensor 6 and the centrifugal switch, transmit their signals to one or more signal processing circuits, generally designated by the reference numeral 8. At least some, preferably all of the signal processing circuits 8 are provided on the wheel rim, either inside or outside the tire. One or more of the sensors and signal processing circuits can be combined with the microprocessor in a single, custom application specific integrated sensor.

As shown in FIG. 1, the at least one signal processing circuit 8 has several functions. One function 10, or one portion of the processor if a single microprocessor is provided, receives the output from the radial accelerometer 2 and, if provided, lateral accelerometer 4, the temperature and pressure sensors 6 and the centrifugal switch, and provides power to the sensors 2, 4 and 6. Another function 12, or one portion of the signal processing circuit 8 if a single processor is provided, is an analog to digital converter to convert the analog signals from the sensors 2, 4 and 6 to digital signals.

A microprocessor 14, or another portion of the signal processing circuit 8 if a single processor is used, processes the digitized output of the sensors to determine the tread wear, shock absorber performance, balance condition, and/or wheel rotational speed, as will be described hereinafter, and makes a decision as to whether or not to transmit an information signal to the driver. If a decision is made by the microprocessor 14 to transmit an information signal to the driver, then transmitter 16, or one portion of the signal processing circuit 8 if a single processor is used, transmits the information signal wirelessly from the wheel through transmitter antenna 18.

The wireless signal is received by an antenna 20 of a receiver 22 provided onboard the vehicle. The information signal is processed by microprocessor 24 and sent to body control module or information display 26. The information signal can either be a warning signal, with or without an accompanying audio alert, or a quantitative data read out showing the relative tread wear, shock absorber and/or balance condition. In the case of wheel rotational speed, the signal is provided to a vehicle controller, such as an anti-lock braking system or integrated vehicle controller.

The driver information display can be provided either in the dash board, on the rear view mirror or in an overhead console, as can be appreciated by those skilled in the art.

Figure 2:
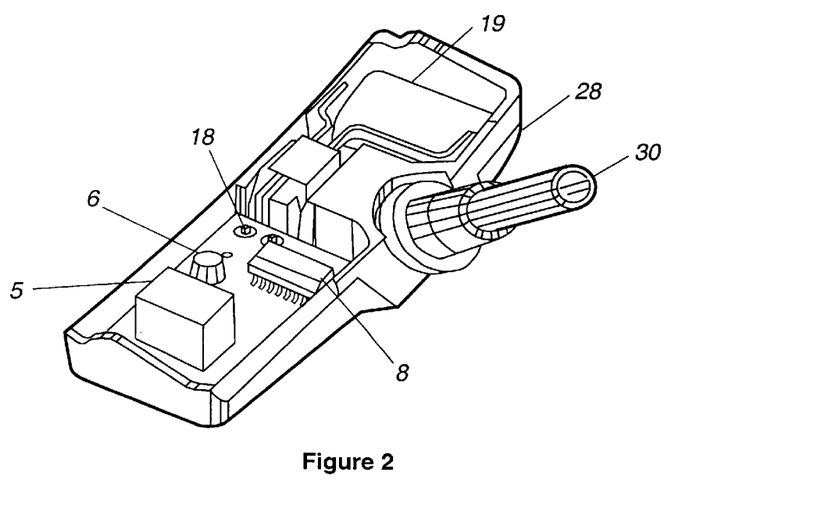
FIG. 2 is a perspective view of an embodiment of an integrated sensor and processor unit which can be used in the method and system of the present invention.
Figure 3:
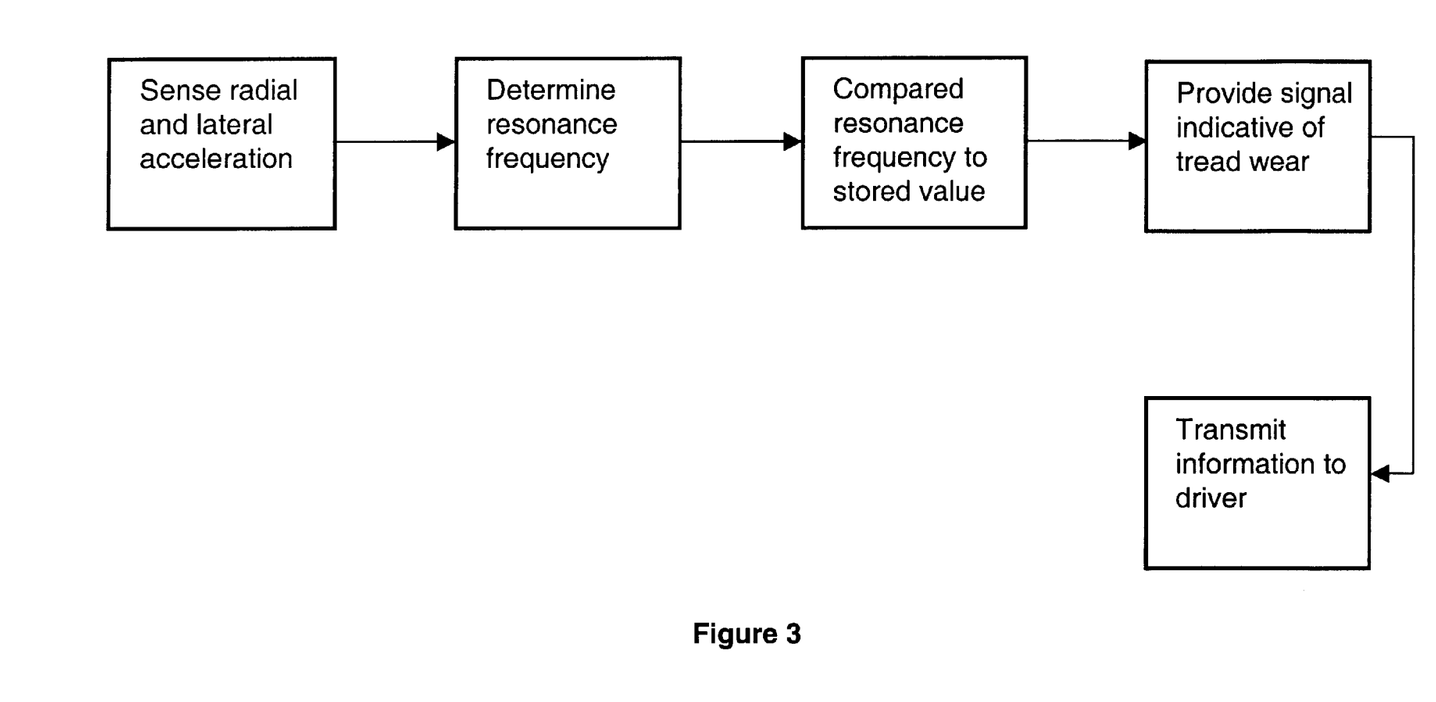
FIGS. 3–5 are flow charts showing the process steps carried out by the microprocessor in the various embodiments of the present invention.
Figure 4:
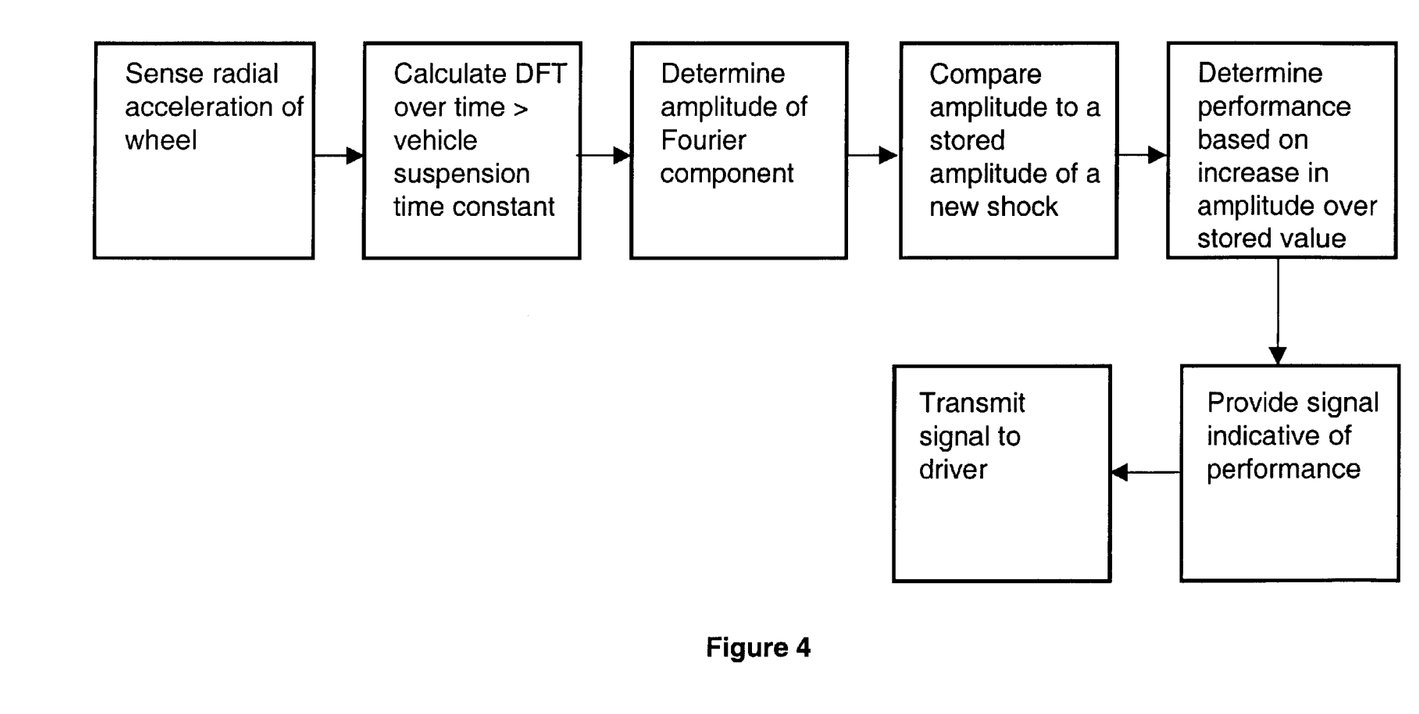
Figure 5:
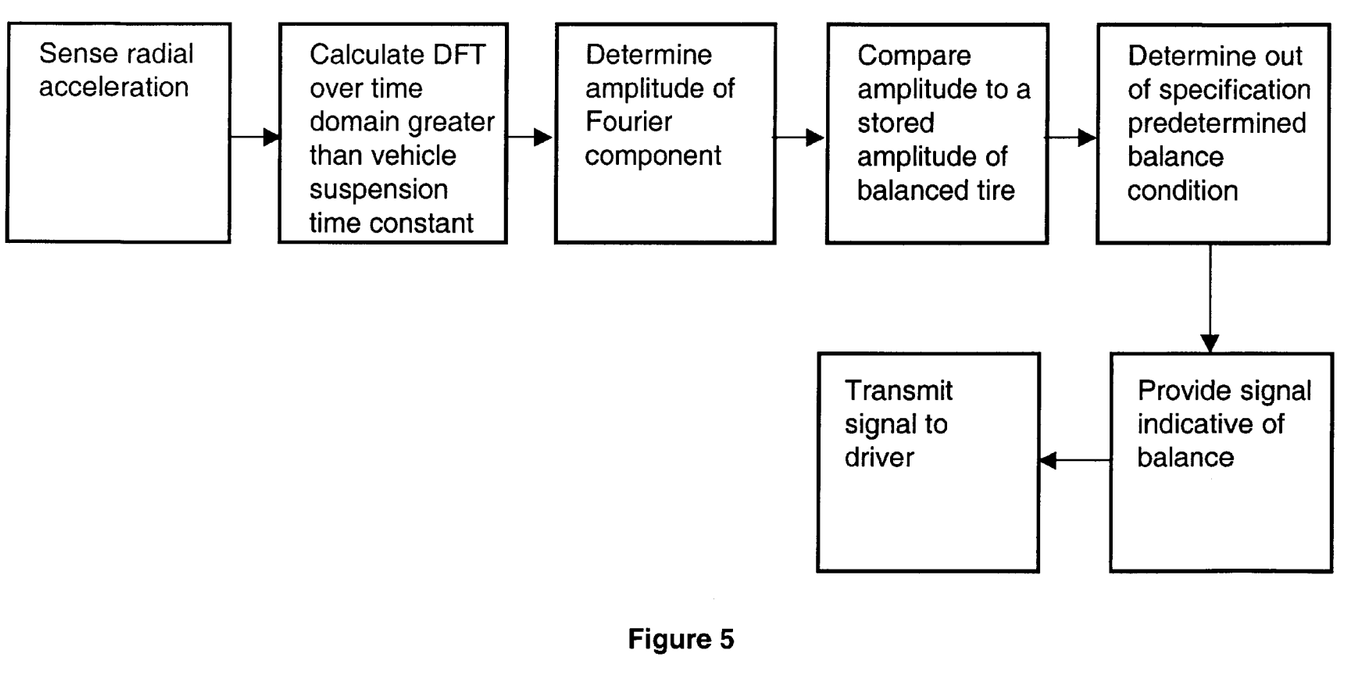

FIG. 2 is schematic perspective drawing showing one embodiment of the wheel mounted portion of the system. In the embodiment shown in FIG. 2, the sensors 2, 4 and 6, as well as the signal processing circuit 8 and transmitter antenna 18, are provided on the rim, inside the tire. In particular, they are provided inside a casing 28 which can be adjustably mounted around a valve stem 30 of the tire. While in this embodiment the casing 28 is provided around the valve stem 30 inside the tire, other locations are possible, as would be understood by one of ordinary skill in the art. For example, the sensors and the at least one microprocessor can be provided anywhere on the rim, as long as the sensors are spaced from the axis of rotation of the wheel and are protected from the elements, e.g., in a casing on the rim, outside the tire. The protective casing 28 shown in FIG. 2 can also be provided inside the tire using a band mount for mounting the casing to the rim, without mounting the casing 28 on the valve stem 30.

In the embodiment shown in FIG. 2, the radial accelerometer 2 and the lateral accelerometer 4 are provided as a two-axis accelerometer 5. The temperature and pressure sensors 6 are also provided in the casing 28. A single, application specific signal processing circuit 8, having the functions 10, 12, 14 and 16 shown in FIG. 1 is provided in the casing 28, as is the antenna 18. A battery 19 for providing power to the signal processing circuit 8 and sensors 5, 6 is also provided. The battery is preferably a lithium battery. The casing 28 and the elements provided therein are virtually maintenance-free. In this regard, while some or all of the microprocessors or microprocessor functions 10, 12, 14 could be provided onboard the vehicle in microprocessor 24 of receiver 22, it is preferred that the microprocessors or functions 10, 12 and 14 be provided on the wheel unit to conserve battery life. The battery life can be conserved by processing the information to determine the tread wear, shock absorber performance and balance condition with microprocessor or microprocessor portion 14 and transmitting an information signal only if the tread wear, shock absorber performance and/or balance conditions significantly change, e.g., deteriorate beyond an acceptable level. By limiting the number of transmissions in this manner, the battery life can be extended. Of course, as would be understood by one skilled in the art, it is possible to continuously or intermittently transmit the signals from one or more of the sensors 2, 4 and 6 to the receiver 22 and to process the signals with microprocessor 24.

The present invention is based on applicants' findings that the radial and/or lateral acceleration of the wheel or tire can be used to provide information regarding tread wear, shock absorber performance, balance condition and/or wheel rotation speed. Applicants have found that a large component of the tire resonance frequency is related to tread depth so that, as the tire wears, the resonance frequency shifts An increase in the radial acceleration signal amplitude in a certain range is indicative of a non-functional or poorly functioning shock absorber, while a radial acceleration signal amplitude increase in another frequency range is indicative of increased tire imbalance. In addition, the radial signal frequency is indicative of wheel rotational speed and can be used to provide wheel rotational speed data to a vehicle controller such as an antilock braking system or an integrated vehicle controller.

A radial or lateral tire shell resonance frequency shift, e.g., in the 30 to 60 Hz range is indicative of increased tire wear. By comparing the radial or lateral tire shell resonance frequency to a base line number measured or calculated for a new tire, the present invention can provide an indication of increased tire wear. The frequency ranges may vary with vehicle and tire types.

More particularly, in order to monitor tread wear, the radial acceleration is measured by the radial accelerometer 2 or the lateral acceleration is measured by the lateral accelerometer 4 or both the radial and lateral accelerations are measured by a two-axis (or three axis) accelerometer 5 over a time duration longer than a vehicle suspension time constant. For a passenger car, for example, the vehicle suspension constant is typically one second or less, e.g., 0.5–1.0 seconds; in that case it is preferred that the acceleration be measured over a period about 10–20 times longer than the vehicle suspension time constant, e.g., for 10 seconds. The measured acceleration signals are transmitted to the signal processing circuit or microprocessor portion 10 which controls the accelerometer 2, 4 or 5 and transmits the signals to analog to digital converter 12. The digital signals are then transmitted to microprocessor or microprocessor portion 14 which calculates a Discrete Fourier Transform (DFT) of the acceleration signals, e.g., by taking a Fast Fourier Transform (FFT) of the acceleration signals, to determine the at least one resonance frequency of at least one of the radial and lateral acceleration of the tire. The Fast Fourier Transform (FFT) of the radial and/or lateral acceleration signals is taken over a large enough range of frequencies, e.g., 0–150 Hz, to determine a resonance frequency in the range of 30–60 Hz of the radial and/or lateral acceleration of the tire, i.e., by selecting peak frequencies in that range. The microprocessor or microprocessor portion 14 compares the resonance frequency to a stored resonance frequency, e.g., in the range of 30–60 Hz indicative of no tire wear to determine a frequency shift. That is, the microprocessor or microprocessor portion 14 compares the resonance frequency of the radial acceleration to a stored resonance frequency for the radial acceleration e.g., in the range of 30–60 Hz indicative of no tire wear and/or compares the resonance frequency of the lateral acceleration to a stored resonance frequency for the lateral acceleration, e.g., in the range of 30–60 Hz indicative of no tire wear to determine a frequency shift and determines tire tread wear on the basis of the frequency shift. It then provides an information signal which is transmitted by transmit circuits 16 to transmitter 18. The signal is received by antenna 20 of receiver 22, processed by microprocessor 24 and sent to the driver information display 26 as a visual alarm (with or without an audible alarm) and/or quantitative readout. The frequency ranges may vary with vehicle and tire types.

In order to monitor shock absorber performance of a shock absorber attached to a vehicle wheel the system and method of the present invention use a sensor 2 which senses at least the radial acceleration of a tire to provide acceleration signals. The signals are provided to the signal processing circuit or microprocessor portion 10 which controls the accelerometer 2 and transmits the signals to analog to digital converter 12. The digital signals are then transmitted to microprocessor or microprocessor portion 14 which calculates a Discrete Fourier Transform (DFT) of the acceleration signals, e.g., by taking a Fast Fourier Transform (FFT) of the acceleration signals, measured over a time duration longer than a vehicle suspension time constant, determines an amplitude of the Fourier component of the radial acceleration, e.g., in the range of 0.5–2.0 Hz, compares the amplitude to a stored amplitude, e.g., in the range of 0.5–2.0 Hz indicative of a new shock absorber for the vehicle, and determines shock absorber performance on the basis of any increase in the amplitude over the stored amplitude, and provides an information signal indicative of shock absorber performance which is transmitted by transmit circuits 16 to transmitter antenna 18. The signal is received by antenna 20 of receiver 22, processed by microprocessor 24 and sent to the driver information display 26 as a visual alarm (with or without an audible alarm) and/or quantitative readout. The frequency ranges may vary with vehicle and tire types.

In order to monitor a balance condition of a vehicle tire, the system and method use a sensor 2 which senses at least the radial acceleration of a tire to provide acceleration signals. The signals are provided to the signal processing circuit or microprocessor portion 10 which controls the accelerometer 2 and transmits the signals to analog to digital converter 12. The digital signals are then transmitted to microprocessor or microprocessor portion 14 which calculates a Discrete Fourier Transform (DFT) of the acceleration signals, e.g., by taking a Fast Fourier Transform (FFT) of the acceleration signals, measured over a time duration longer than a vehicle suspension time constant, determines an amplitude of the Fourier component of the radial acceleration, e.g., in the range of 5–14 Hz, compares the amplitude to a stored amplitude, e.g., in the range of 5–14 Hz indicative of a specification predetermined balanced tire for the vehicle, and determines any out of specification predetermined balance condition of the tire on the basis of any increase in the amplitude over the stored amplitude, and provides an out of specification predetermined balance condition which is transmitted by transmit circuits 16 to antenna 18. The signal is received by antenna 20 of receiver 22, processed by microprocessor 24 and sent to the driver information display. The frequency ranges may vary with vehicle and tire types.

In order to monitor wheel rotational speed of a vehicle wheel, the system and method use a sensor 2 which senses at least the radial acceleration of a tire to provide acceleration signals. A transceiver, including, e.g., transmit circuits 16 and an antenna 18, then transmits a radial signal frequency in the range of 0–25 Hz indicative of wheel rotational speed to a receiver of a vehicle controller such as an antilock braking system (ABS) or an integrated vehicle controller (IVC). This system can be used to replace the wheel speed sensors currently being used. If the present invention is incorporated on the vehicle to monitor tread wear, shock absorber performance, and/or balance condition of a vehicle tire, using the system and method of the present invention eliminates the need for the wheel speed sensors currently being used and their associated expense.

The stored values indicative of no tread wear, specification and predetermined balance and a new shock absorber can be measured or calculated. For example, at an OEM assembly plant, for a new car with new tires and new shock absorbers, at a given wheel/vehicle speed and nominal tire pressure, for each tire, one can take the FFT (0.5 to 150 Hz) of radial and lateral components of acceleration and establish base line signals (both amplitude and frequency) in the frequency range of 0.5 to 2 Hz for the radial acceleration signal (frequency of the resonance of the sprung mass of the car for determining the performance of the shock absorber); in the range of 0 to 14 Hz of the radial acceleration signal (rotational frequency/speed of a tire and range for determining tire balance); and in the range of 30 to 60 Hz of the radial and/or lateral acceleration signal (to determine the first radial resonance of the tire shell). At a given nominal tire pressure, the FFT of the tire pressure signal is determined, as are the peak frequency components and amplitudes. These base line numbers can be stored in an onboard memory in a microprocessor. While the vehicle is on the road, the system and method of the present invention can periodically monitor these signals and calculate these numbers at a known wheel/vehicle speed and compare the monitored signals with the base line numbers. Significant deviations in these signals can be used to send an alarm. For example, a radial signal amplitude increase in a range of 0.5 to 2 Hz is indicative of a non-functional shock absorber. A radial signal amplitude increase, e.g., in a range of 5 to 14 Hz is indicative of increased tire imbalance. A radial tire shell resonance frequency shift, e.g., in a range of 30 to 60 Hz is indicative of increased tire wear. A lateral tire shell resonance frequency shift, e.g., in a range of 30 to 60 Hz is indicative of increased tire wear. The radial signal frequency, e.g, in the range of 0 to 25 Hz can be used as an indication of wheel rotational speed for ABS and IVC applications.

In order to determine the alarm thresholds, a series of calibration tests can be conducted on a standard set of tires over the speed, pressure and wear ranges of interest to create a look-up table a priori for each platform. As an alternative to measuring and calibrating every wheel in the factory to set frequencies, it may be sufficient for a given platform with known wheel modules to load in the previously existing calibration data for that set. This look-up table can be encoded in a microprocessor with decision software at the OEM locations. Some of this encoding may be made available for after market users.

What is claimed is:

1. A system for monitoring at least tire tread wear of a vehicle tire, comprising:
    a sensor which senses at least one of radial and lateral acceleration of a tire to provide acceleration signals;
    a driver information display; and
    at least one processor, responsive to acceleration signals from the sensor, which determines at least one resonance frequency of at least one of the radial and lateral acceleration of the tire, compares the determined at least one resonance frequency to at least one stored frequency, determines the tire tread wear on the basis of the comparison, and provides an information signal indicative of tire tread wear which is transmitted to the driver information display.

2. The system for monitoring at least tire tread wear according to claim 1, wherein the at least one processor calculates a Discrete Fourier Transform (DFT) of the acceleration signals to determine the at least one resonance frequency of at least one of the radial and lateral acceleration of the tire measured over a time duration longer than a vehicle suspension time constant.

3. The system for monitoring at least tire tread wear according to claim 2, wherein the at least one processor calculates the Discrete Fourier Transform (DFT) of the acceleration signals by taking a Fast Fourier Transform (FFT) of the acceleration signals.

4. The system for monitoring at least tire tread wear according to claim 2, wherein the sensor and the at least one processor are provided inside the tire.

5. The system for monitoring at least tire tread wear according to claim 4, further comprising a transmitter provided on a rim on which the tire is mounted or inside the tire which wirelessly transmits the information signal, and a receiver provided onboard the vehicle for receiving the wirelessly transmitted information signal.

6. The system for monitoring at least tire tread wear according to claim 5, wherein the information signal is a warning signal, and wherein the at least one processor determines whether the tire tread has worn beyond an acceptable level and provides the warning signal which is transmitted to the driver information display if it is determined that the tire tread has worn beyond an acceptable level.

7. The system for monitoring at least tire tread wear according to claim 5, wherein the sensor is a two axis accelerometer for measuring radial and lateral acceleration.

8. The system for monitoring at least tire tread wear according to claim 5, wherein the sensor is a three axis accelerometer for measuring radial, lateral and longitudinal acceleration.

9. The system for monitoring at least tire tread wear according to claim 5, further comprising a pressure sensor provided inside the tire which senses tire inflation pressure and provides a signal indicative of tire inflation pressure to the at least one processor.

10. The system for monitoring at least tire tread wear according to claim 9, further comprising a temperature sensor provided inside the tire which senses the temperature inside the tire and provides a signal indicative of the temperature inside the tire to the at least one processor.

11. The system for monitoring at least tire tread wear according to claim 2, wherein the sensor senses at least the radial acceleration, wherein the at least one processor takes a Fast Fourier Transform (FFT) of the radial acceleration signals to determine a resonance frequency in the range of 30–60 Hz of the radial acceleration of the tire, and compares the resonance frequency to a stored resonance frequency in the range of 30–60 Hz indicative of no tire wear to determine a frequency shift, and determines tire tread wear on the basis of the frequency shift.

12. The system for monitoring at least tire tread wear according to claim 11, wherein the at least one processor determines an amplitude of the Fourier component of the radial acceleration in the range of 0.5–2.0 Hz, compares the amplitude to a stored amplitude in the range of 0.5–2.0 Hz indicative of a new shock absorber for the vehicle, and determines shock absorber performance on the basis of any increase in the amplitude over the stored amplitude.

13. The system for monitoring at least tire tread wear according to claim 11, wherein the at least one processor determines an amplitude of the Fourier component of the radial acceleration in the range of 5–14 Hz, compares the amplitude to a stored amplitude in the range of 5–14 Hz indicative of a specification predetermined balanced tire for the vehicle, and determines any out of specification predetermined balance condition of the tire on the basis of any increase in the amplitude over the stored amplitude.

14. The system for monitoring at least tire tread wear according to claim 2, wherein the sensor senses at least the lateral acceleration, wherein the at least one processor takes a Fast Fourier Transform (FFT) of the lateral acceleration signals to determine a resonance frequency in the range of 30–60 Hz of the lateral acceleration of the tire, and compares the resonance frequency to a stored frequency in the range of 30–60 Hz indicative of no tire wear to determine a frequency shift, and determines tire tread wear on the basis of the frequency shift.

15. The system for monitoring at least tire tread wear according to claim 14, wherein the sensor also senses the radial acceleration, wherein the at least one processor takes a Fast Fourier Transform (FFT) of the radial acceleration signals to determine a resonance frequency in the range of 30–60 Hz of the radial acceleration of the tire, and compares the resonance frequency to a stored frequency in the range of 30–60 Hz indicative of no tire wear to determine a frequency shift, and determines tire tread wear on the basis of the frequency shift.

16. The system for monitoring at least tire tread wear according to claim 2, wherein the sensor and the at least one processor are provided on a rim of the wheel outside the tire.

17. The system for monitoring at least tire tread wear according to claim 1, wherein the sensor senses at least the radial acceleration, and wherein the system further comprises a transceiver which transmits a radial signal frequency in the range of 0–25 Hz indicative of wheel rotational speed to at least one of an antilock braking system and an integrated vehicle controller.

18. A method for monitoring at least tire tread wear of a vehicle tire, comprising the steps of:
sensing at least one of radial and lateral acceleration of a tire to provide acceleration signals;
determining at least one resonance frequency of at least one of the radial and lateral acceleration of the tire based on the acceleration signals;
comparing the at least one resonance frequency to at least one stored frequency and determining the tire tread wear on the basis of the comparison;
providing an information signal indicative of tire tread wear; and
transmitting the information signal indicative of tire tread wear to a driver information display.

19. The method for monitoring at least tire tread wear of a vehicle tire according to claim 18, wherein the step of determining at least one resonance frequency of at least one of the radial and lateral acceleration of the tire comprises calculating a Discrete Fourier Transform (DFT) of the acceleration signals measured over a time duration longer than a vehicle suspension time constant and determining at least one peak of the Fourier component of the acceleration signals representing the at least one resonance frequency.

20. The method for monitoring at least tire tread wear of a vehicle tire according to claim 19, wherein the Discrete Fourier Transform (DFT) of the acceleration signals is calculated by taking a Fast Fourier Transform (FFT) of the acceleration signals.

21. The method for monitoring at least tire tread wear of a vehicle tire according to claim 19, further comprising wirelessly transmitting the information signal from a transmitter provided on a rim on which the tire is mounted or inside the tire to a receiver provided onboard the vehicle.

22. The method for monitoring at least tire tread wear of a vehicle tire according to claim 21, wherein the step of determining the tire tread wear on the basis of the comparison comprises determining whether the tire tread has worn beyond an acceptable level, wherein the information signal is a warning signal and wherein the step of transmitting the information signal indicative of tire tread wear to a driver information display comprises transmitting the warning signal to the driver information display if it is determined that the tire tread has worn beyond an acceptable level.

23. The method for monitoring at least tire tread wear of a vehicle tire according to claim 19, wherein the step of sensing at least one of radial and lateral acceleration of a tire comprises sensing the radial and the lateral acceleration of the tire by a two axis accelerometer.

24. The method for monitoring at least tire tread wear of a vehicle tire according to claim 19, further comprising measuring the longitudinal acceleration of the tire.

25. The method for monitoring at least tire tread wear of a vehicle tire according to claim 19, wherein the step of sensing at least one of radial and lateral acceleration of a tire to provide acceleration signals comprises sensing at least the radial acceleration, wherein the step of determining at least one resonance frequency of at least one of the radial and lateral acceleration of the tire comprises taking a Fast Fourier Transform (FFT) of the radial acceleration signals to determine a resonance frequency in the range of 30–60 Hz of the radial acceleration of the tire, and the step of comparing the at least one resonance frequency to at least one stored frequency and determining the tire tread wear on the basis of the comparison comprises comparing the resonance frequency to a stored resonance frequency in the range of 30–60 Hz indicative of no tire wear to determine a frequency shift, and determining tire tread wear on the basis of the frequency shift.

26. The method for monitoring at least tire tread wear of a vehicle tire according to claim 19, wherein the step of sensing at least one of radial and lateral acceleration of a tire to provide acceleration signals comprises sensing at least the lateral acceleration, wherein the step of determining at least one resonance frequency of at least one of the radial and lateral acceleration of the tire comprises taking a Fast Fourier Transform (FFT) of the lateral acceleration signals to determine a resonance frequency in the range of 30–60 Hz of the lateral acceleration of the tire, and the step of comparing the at least one resonance frequency to at least one stored frequency and determining the tire tread wear on the basis of the comparison comprises comparing the resonance frequency to a stored resonance frequency in the range of 30–60 Hz indicative of no tire wear to determine a frequency shift, and determining tire tread wear on the basis of the frequency shift.

27. The method for monitoring at least tire tread wear of a vehicle tire according to claim 19, wherein the step of sensing at least one of radial and lateral acceleration of a tire to provide acceleration signals comprises sensing both of the radial and the lateral acceleration, wherein the step of determining at least one resonance frequency of at least one of the radial and lateral acceleration of the tire comprises taking a Fast Fourier Transform (FFT) of the radial acceleration signals and a Fast Fourier Transform (FFT) of the lateral acceleration signals to determine a resonance frequency in the range of 30–60 Hz of the radial acceleration of the tire and a resonance frequency in the range of 30–60 Hz of the lateral acceleration of the tire, and the step of comparing the at least one resonance frequency to at least one stored frequency and determining the tire tread wear on the basis of the comparison comprises comparing the resonance frequencies of the radial and lateral accelerations to a stored resonance frequencies in the range of 30–60 Hz indicative of no tire wear to determine frequency shifts, and determining tire tread wear on the basis of the frequency shifts.

28. The method for monitoring at least tire tread wear of a vehicle tire according to claim 19, further comprising determining an amplitude of the Fourier component of the radial acceleration in the range of 0.5–2.0 Hz, comparing the amplitude to a stored amplitude in the range of 0.5–2.0 Hz indicative of a new shock absorber for the vehicle, and determining shock absorber performance on the basis of any increase in the amplitude over the stored amplitude.

29. The method for monitoring at least tire tread wear of a vehicle tire according to claim 19, further comprising determining an amplitude of the Fourier component of the radial acceleration in the range of 5–14 Hz, comparing the amplitude to a stored amplitude in the range of 5–14 Hz indicative of a specification predetermined balanced tire for the vehicle, and determining any out of specification predetermined balance condition of the tire on the basis of any increase in the amplitude over the stored amplitude.

30. The method for monitoring at least tire tread wear of a vehicle tire according to claim 19, further comprising transmitting a radial signal frequency in the range of 0–25 Hz indicative of wheel rotational speed to at least one of an antilock braking system and an integrated vehicle controller.

31. A system for monitoring at least shock absorber performance of a shock absorber attached to a vehicle wheel, comprising:
a sensor which senses at least radial acceleration of the wheel to provide acceleration signals;
a driver information display; and
at least one processor, responsive to acceleration signals from the sensor, which calculates a Discrete Fourier Transform (DFT) of the acceleration signals measured over a time duration longer than a vehicle suspension time constant, determines an amplitude of the Fourier component of the radial acceleration, compares the amplitude to a stored amplitude indicative of a new shock absorber for the vehicle, and determines shock absorber performance on the basis of any change in the amplitude over the stored amplitude, and provides an information signal indicative of shock absorber performance which is transmitted to the river information display.

32. The system for monitoring at least shock absorber performance of a shock absorber attached to a vehicle wheel according to claim 31, wherein the at least one processor determines an amplitude of the Fourier component of the radial acceleration in the range of 0.5–2.0 Hz and compares the amplitude to a stored amplitude in the range of 0.5–2.0 Hz indicative of a new shock absorber for the vehicle.

33. A method for monitoring at least shock absorber performance of a shock absorber attached to a vehicle wheel, comprising the steps of:
sensing at least radial acceleration of the wheel to provide acceleration signals;
calculating a Discrete Fourier Transform (DFT) of the acceleration signals measured over a time duration longer than a vehicle suspension time constant;
determining an amplitude of the Fourier component of the radial acceleration;
comparing the amplitude to a stored amplitude indicative of a new shock absorber for the vehicle;
determining shock absorber performance on the basis of any increase in the amplitude over the stored amplitude;
providing an information signal indicative of shock absorber performance; and
transmitting the information signal indicative of shock absorber performance to a driver information display.

34. The method for monitoring at least shock absorber performance of a shock absorber attached to a vehicle wheel according to claim 33, wherein the steps of determining an amplitude of the Fourier component of the radial acceleration and comparing the amplitude to a stored amplitude indicative of a new shock absorber for the vehicle comprises determining an amplitude of the Fourier component of the radial acceleration in the range of 0.5–2.0 Hz and comparing the amplitude to a stored amplitude in the range of 0.5–2.0 Hz indicative of a new shock absorber for the vehicle.

35. A system for monitoring at least a balance condition of a vehicle tire, comprising:
a sensor which senses at least radial acceleration of the tire to provide acceleration signals;
a driver information display; and
at least one processor, responsive to acceleration signals from the sensor, which calculates a Discrete Fourier Transform (DFT) of the acceleration signals measured over a time duration longer than a vehicle suspension time constant, determines an amplitude of the Fourier component of the radial acceleration, compares the amplitude to a stored amplitude indicative of a specification predetermined balanced tire for the vehicle, and determines any out of specification predetermined balance condition of the tire on the basis of any increase in the amplitude over the stored amplitude.

36. The system for monitoring at least a balance condition of a vehicle tire according to claim 35, wherein the at least one processor determines an amplitude of the Fourier component of the radial acceleration in the range of 5–14 Hz and compares the amplitude to a stored amplitude in the range of 5–14 Hz indicative of a specification predetermined balanced tire for the vehicle.

37. A method for monitoring at least a balance condition of a vehicle tire, comprising the steps of:
- sensing at least radial acceleration of the tire to provide acceleration signals;
- calculating a Discrete Fourier Transform (DFT) of the acceleration signals measured over a time duration longer than a vehicle suspension time constant;
- determining an amplitude of the Fourier component of the radial acceleration;
- comparing the amplitude to a stored amplitude indicative of a specification predetermined balanced tire for the vehicle;
- determining any out of specification predetermined balance condition of the tire on the basis of any increase in the amplitude over the stored amplitude;
- providing an information signal indicative of the balance condition; and
- transmitting the information signal indicative of the balance condition to a driver information display.

38. The method for monitoring at least a balance condition of a vehicle tire according to claim 37, wherein the steps of determining an amplitude of the Fourier component of the radial acceleration and comparing the amplitude to a stored amplitude indicative of a specification predetermined balanced tire for the vehicle comprises determining an amplitude of the Fourier component of the radial acceleration in the range of 5–14 z and comparing the amplitude to a stored amplitude in the range of 5–14 Hz indicative of a specification predetermined balance tire for the vehicle.

* * * * *